United States Patent
Heitzmann et al.

(10) Patent No.: US 6,619,641 B2
(45) Date of Patent: Sep. 16, 2003

(54) WORKPIECE HOLDER

(75) Inventors: Wolfgang Heitzmann, Ludwigsburg (DE); Willi Leible, Oberstenfeld (DE); Werner Schulz, Bierigheim (DE)

(73) Assignee: Hüller Hille GmbH (DE)

( * ) Notice: Subject to any disclaimer, the term of this patent is extended or adjusted under 35 U.S.C. 154(b) by 0 days.

(21) Appl. No.: 10/137,917

(22) Filed: May 2, 2002

(65) Prior Publication Data

US 2002/0175458 A1 Nov. 28, 2002

(30) Foreign Application Priority Data

May 25, 2001 (EP) .............................. 01112649

(51) Int. Cl.⁷ ................................ B23Q 3/08
(52) U.S. Cl. ........................ 269/32; 269/900; 269/309
(58) Field of Search .................... 269/32, 900, 309, 269/37, 41, 53, 54.1, 54.4, 54.5, 289 R, 292, 296

(56) References Cited

U.S. PATENT DOCUMENTS

| | | | |
|---|---|---|---|
| 5,195,227 A | | 3/1993 | Wickham |
| 5,246,217 A | * | 9/1993 | Brot ............................ 269/309 |
| 5,630,577 A | * | 5/1997 | Tankersley ................... 269/309 |
| 5,788,225 A | * | 8/1998 | Iwata et al. .................. 269/309 |
| 6,371,469 B1 | * | 4/2002 | Gray .......................... 269/48.1 |

FOREIGN PATENT DOCUMENTS

| | | |
|---|---|---|
| DE | 320427 | 5/1957 |
| FR | 0321367 | 6/1989 |

* cited by examiner

Primary Examiner—Joseph J. Hail, III
Assistant Examiner—Daniel Shanley
(74) Attorney, Agent, or Firm—McGlew and Tuttle, P.C.

(57) ABSTRACT

A workpiece holder comprises a stationary workpiece holding fixture and a workpiece rest which is releasably attachable thereon and on which can be mounted a workpiece. In all the three coordinate directions, the workpiece rest bears by counterpart surfaces on bearing surfaces formed on the workpiece holding fixture and is aligned and fixed by an oblique chucking appliance in two coordinate directions and by at least one holding-down appliance in the third coordinate direction.

20 Claims, 9 Drawing Sheets

WORKPIECE HOLDER

BACKGROUND OF THE INVENTION

1. Field of the Invention

The invention relates to a workpiece holder.

2. Background Art

A workpiece that is to be machined in several steps of working on various machine tools is fixed in the machine tools by means of chucking appliances for being machined on a workpiece holder. For an ensuing step of working on the following machine tool to be performed, it is detached from the workpiece holder and transported to the following machine tool where it is again fixed on a workpiece holder.

U.S. Pat. No. 3,606,300 teaches a workpiece rest with a workpiece aligned and fixed on it. To this end, the workpiece rest has quite a number of holes. The workpieces and the workpiece rest that carries them are transported together from one machine tool to the next, nothing being said on how fixing takes place on the individual machine tools.

It is known from U.S. Pat. No. 5,558,784 to fix a work that is to be machined on a workpiece rest. The workpiece rest possesses chucking elements in the form of twistlocks which simultaneously constitute centering elements for at least roughly centering and distinctly aligning the workpiece rest on the processing machine tool, it being absolutely necessary to fit the workpiece rest accurately into the machine tool. In the machine tool, the coordinate values i.e., the position of the workpiece rests in the three-dimensional system of coordinates, are measured and offset against the data stored in the machine tool in order for the precise position of the workpiece to be obtained in relation to the coordinate systems of the machine tool.

This familiar method exhibits several drawbacks in installations with various machine tools, for instance transfer machines, or short-cycle flexible manufacturing systems, because the periods needed for accurately fitting in the workpiece rests add to the cycle times of the entire installation.

SUMMARY OF THE INVENTION

It is an object of the invention to embody a workpiece holder that does not require any accurate fitting of the workpiece during or after the chucking process.

According to the invention, this object is attained in a workpiece holder, comprising a workpiece holding fixture; and a workpiece rest; wherein the workpiece rest is provided with arrangements for fixing a workpiece in a given position relative to the workpiece rest; wherein the workpiece holding fixture is provided with bearing surfaces and the workpiece rest with counterpart surfaces that rest on the bearing surfaces for the workpiece rest to have an accurately given position in a first, second and third coordinate direction; and wherein chucking appliances are provided, chucking the workpiece rest relative to the workpiece holding fixture in the first, second and third coordinate direction. The workpiece takes an accurately defined position on the workpiece rest and keeps this position throughout the steps of machining. When transported from one machine tool to the other, the workpiece rest is chucked accurately in all the three coordinate directions, there being no need for renewed fitting of the workpiece into a machine tool.

Further features, advantages and details of the invention will become apparent from the ensuing description of an exemplary embodiment, taken in conjunction with the drawing.

DESCRIPTION OF THE PREFERRED EMBODIMENT

Figure 1:
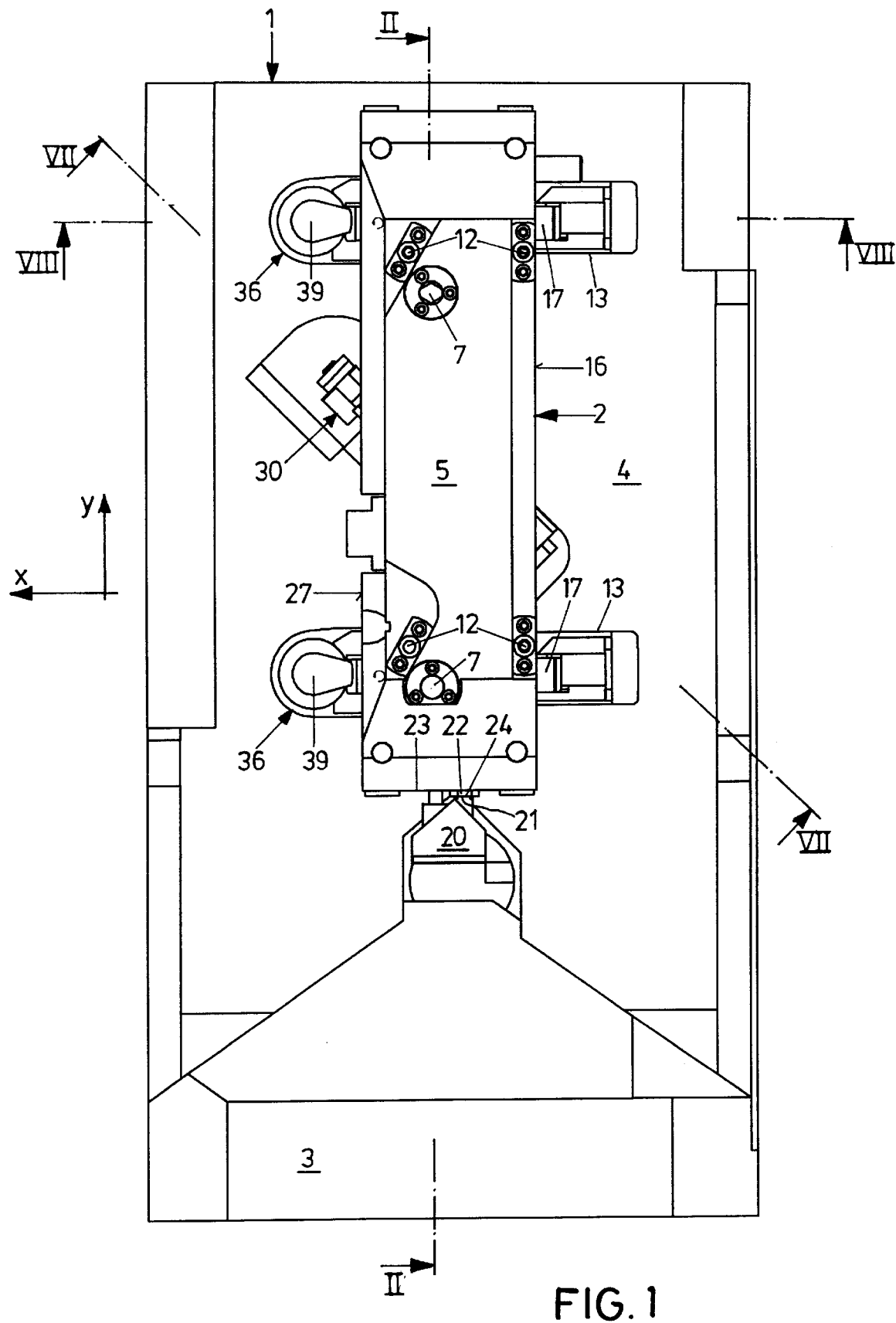
FIG. 1 is a plan view of a workpiece holder with a workpiece rest mounted on a workpiece holding fixture.
Figure 2:
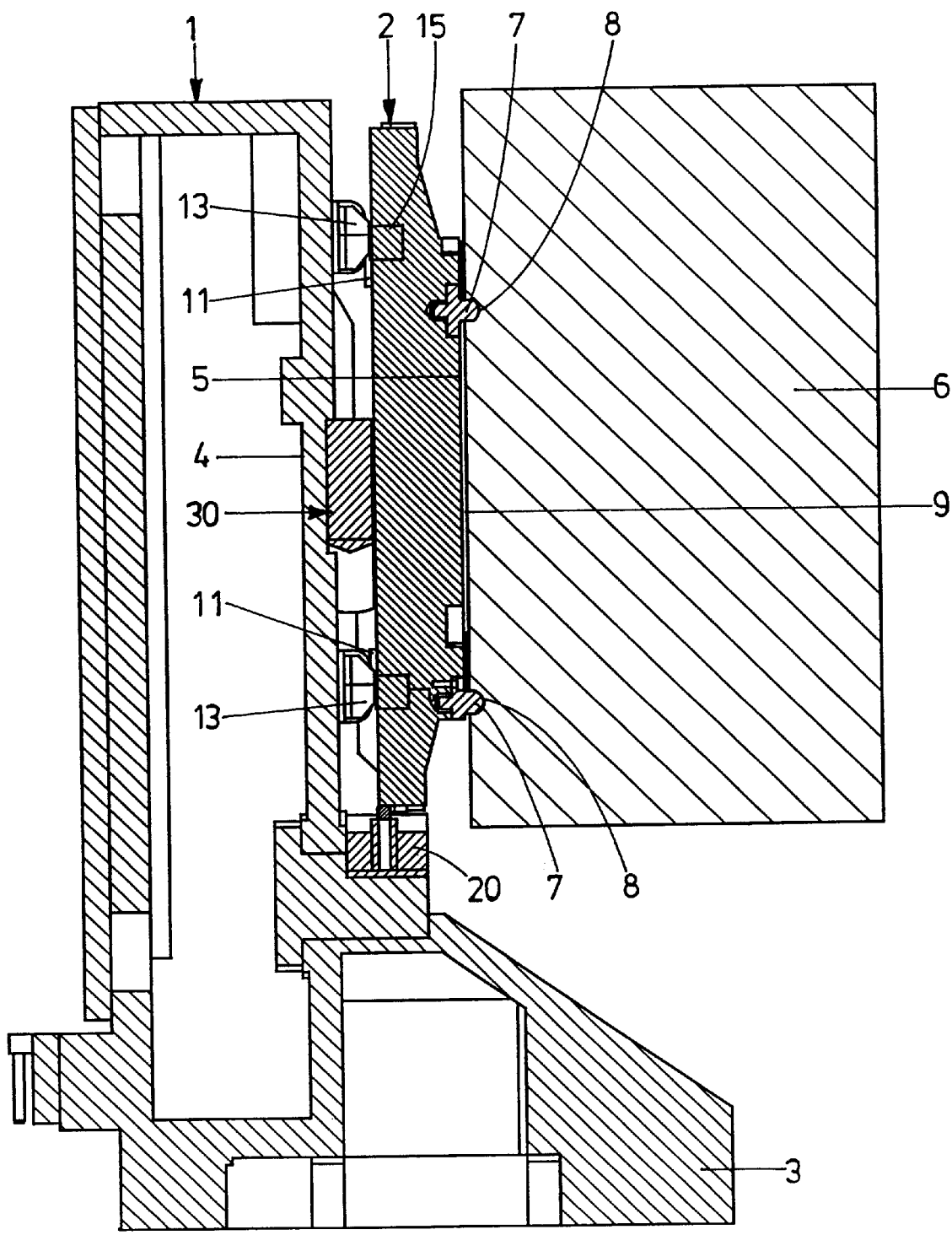
FIG. 2 is a vertical cross-sectional view through the workpiece rest on the line II—II of FIG. 1 with a workpiece mounted on the workpiece rest.
Figure 3:
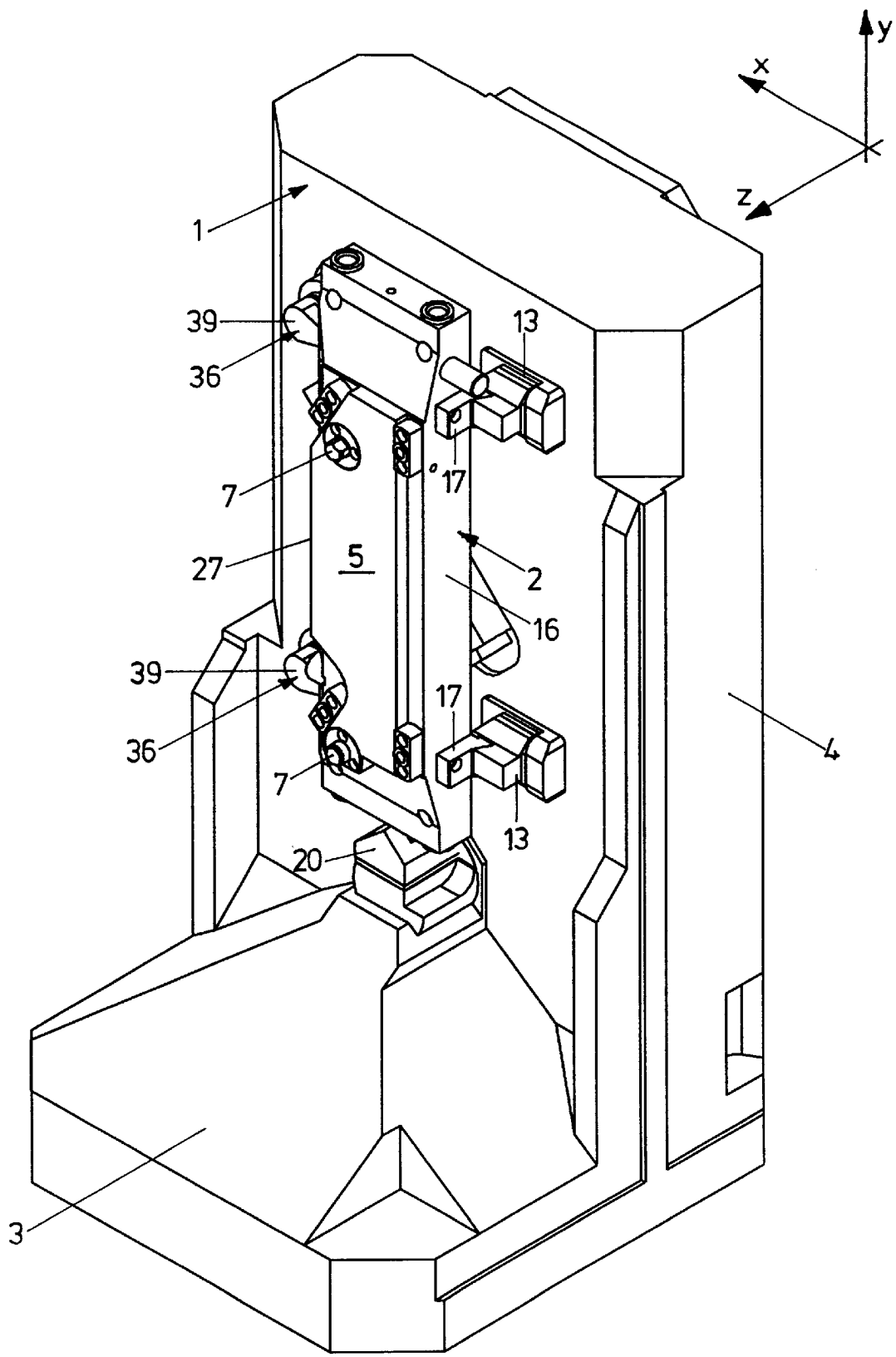
FIG. 3 is a perspective diagonal view of the workpiece holder.
Figure 4:
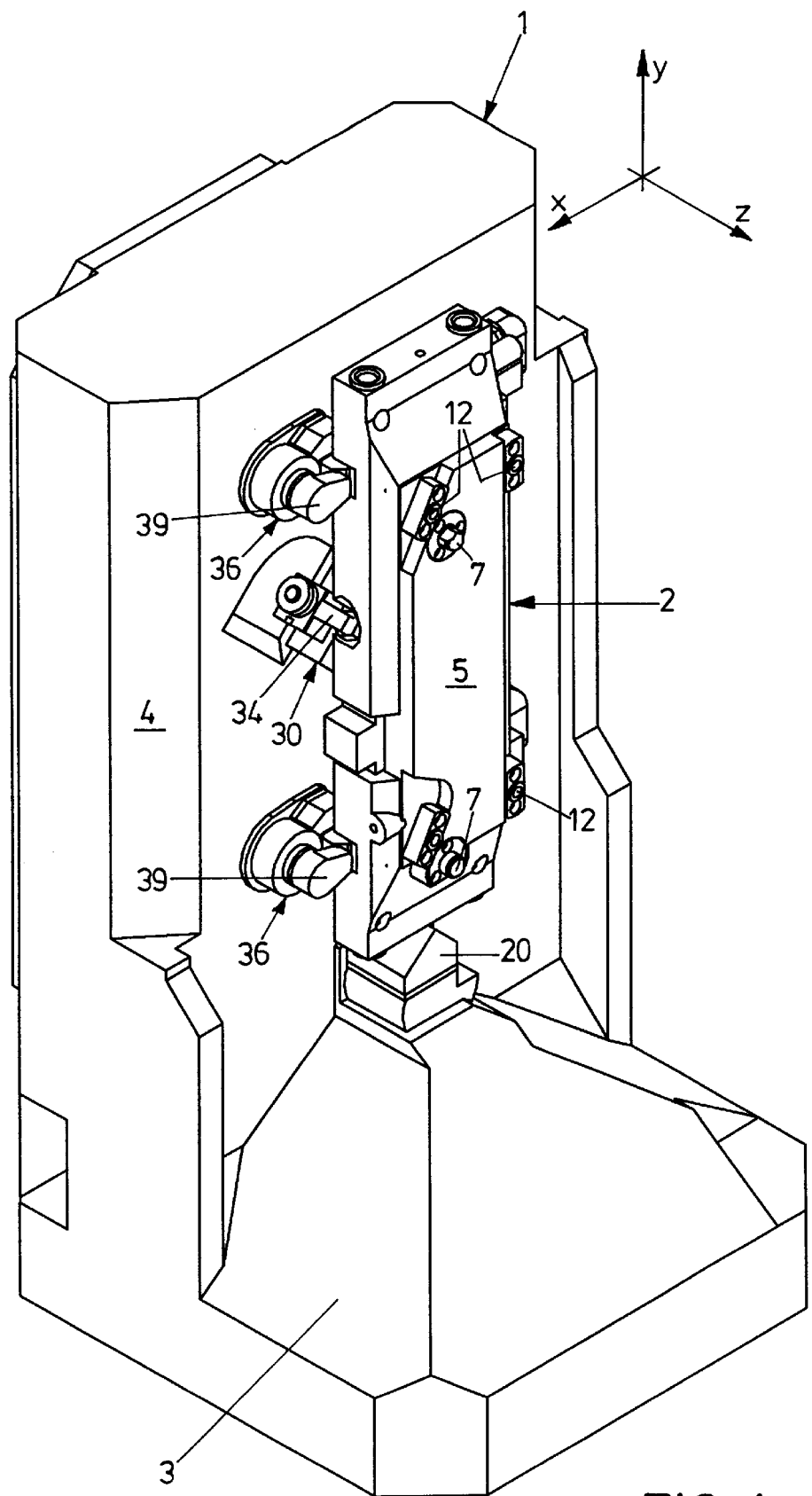
FIG. 4 is another perspective diagonal view of the workpiece holder.
Figure 5:
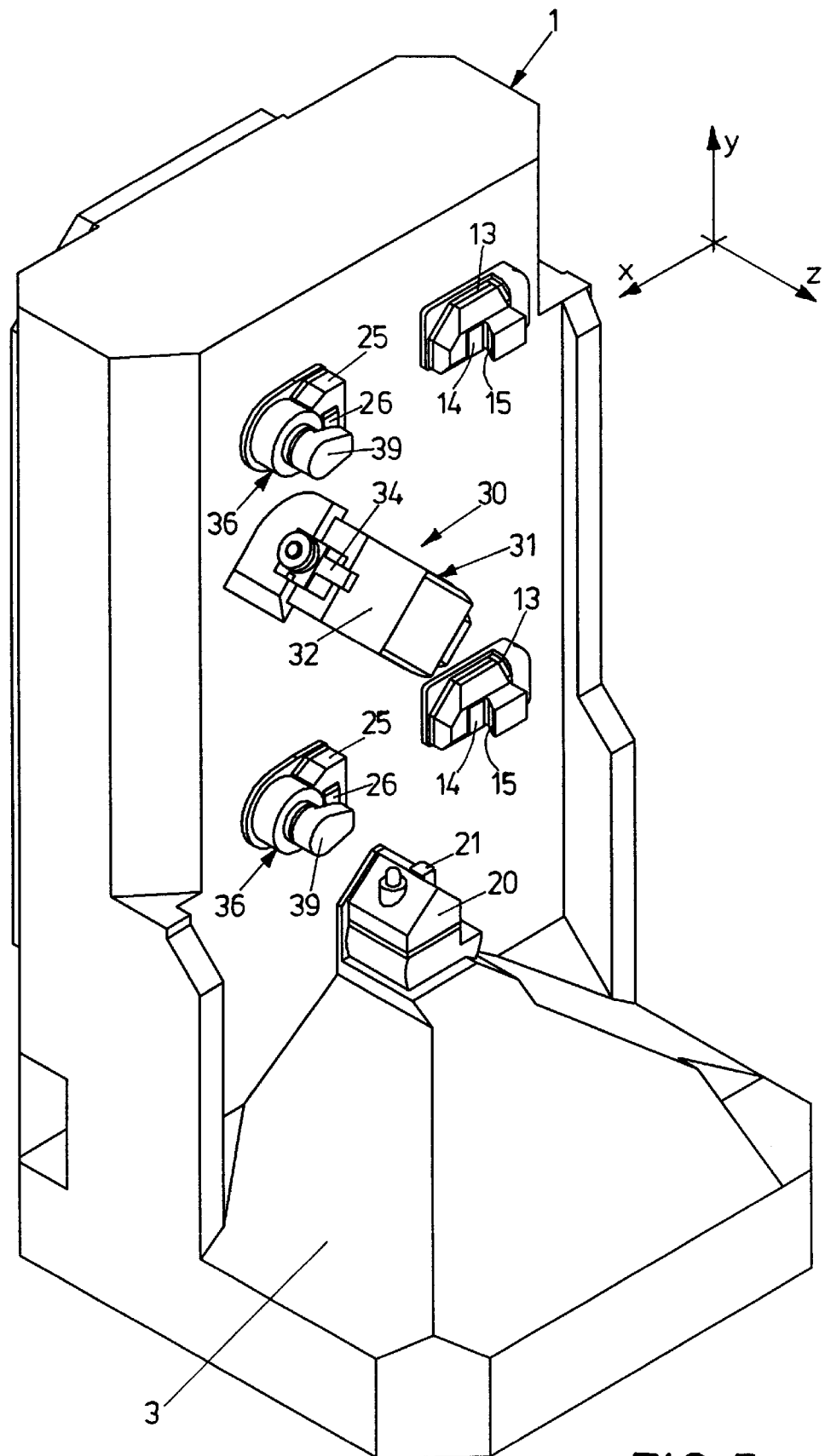
FIG. 5 is a perspective diagonal view of the workpiece holding fixture in accordance with the representation of FIG. 4.
Figure 6:
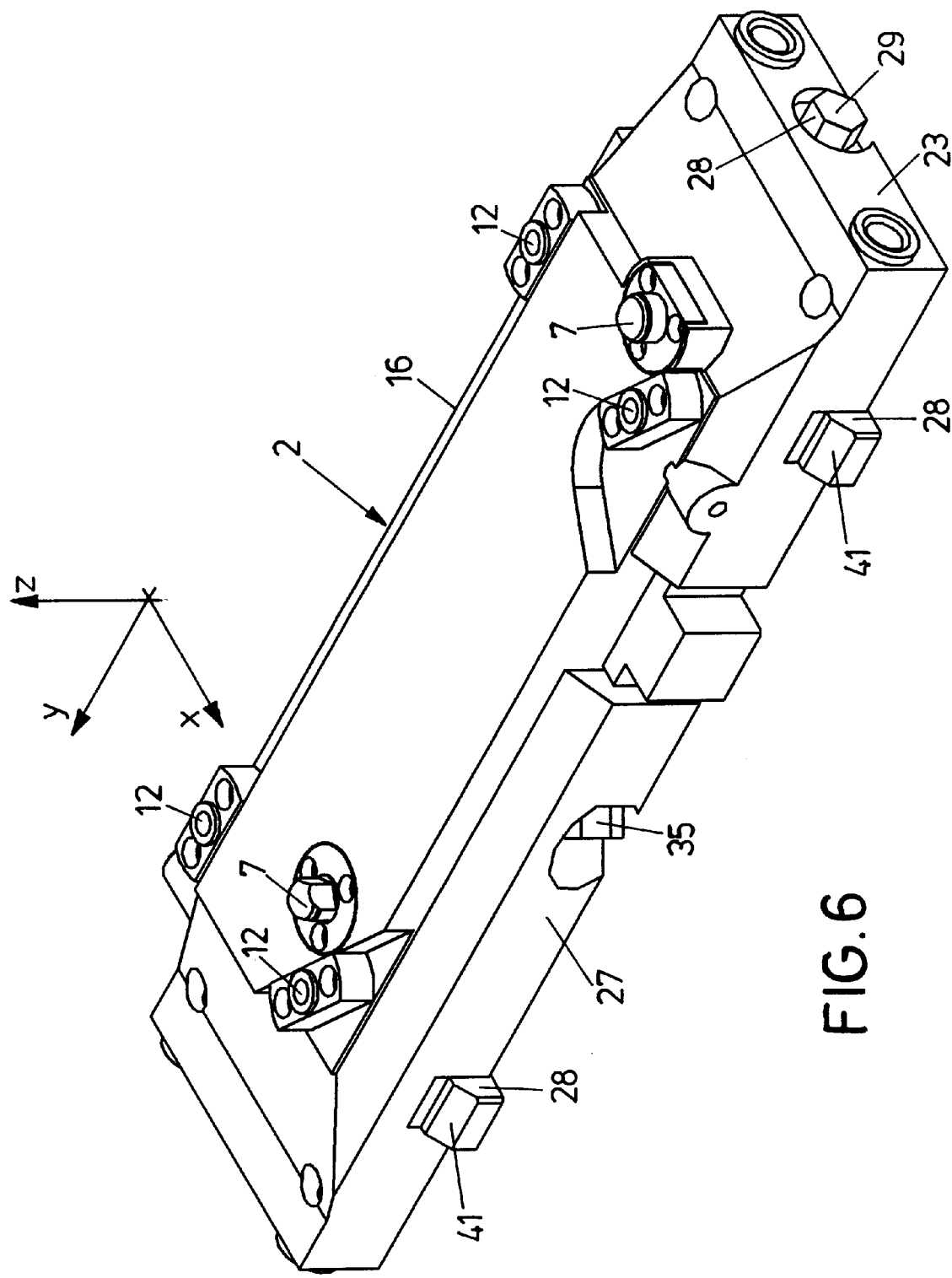
FIG. 6 is a perspective diagonal view of the workpiece rest.
Figure 7:
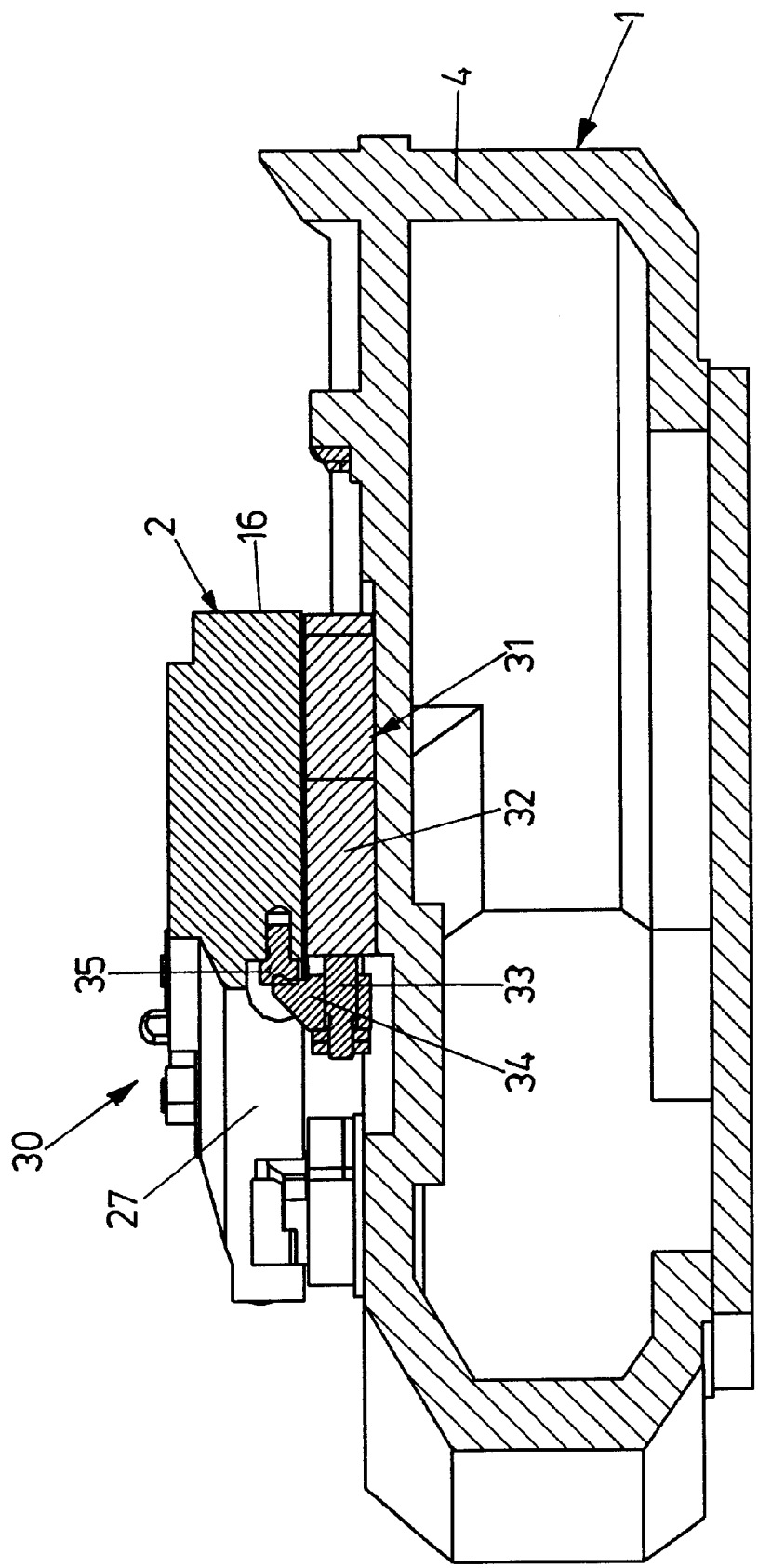
FIG. 7 is a cross-sectional view through the workpiece holder on the line VII—VII of FIG. 1.
Figure 8:
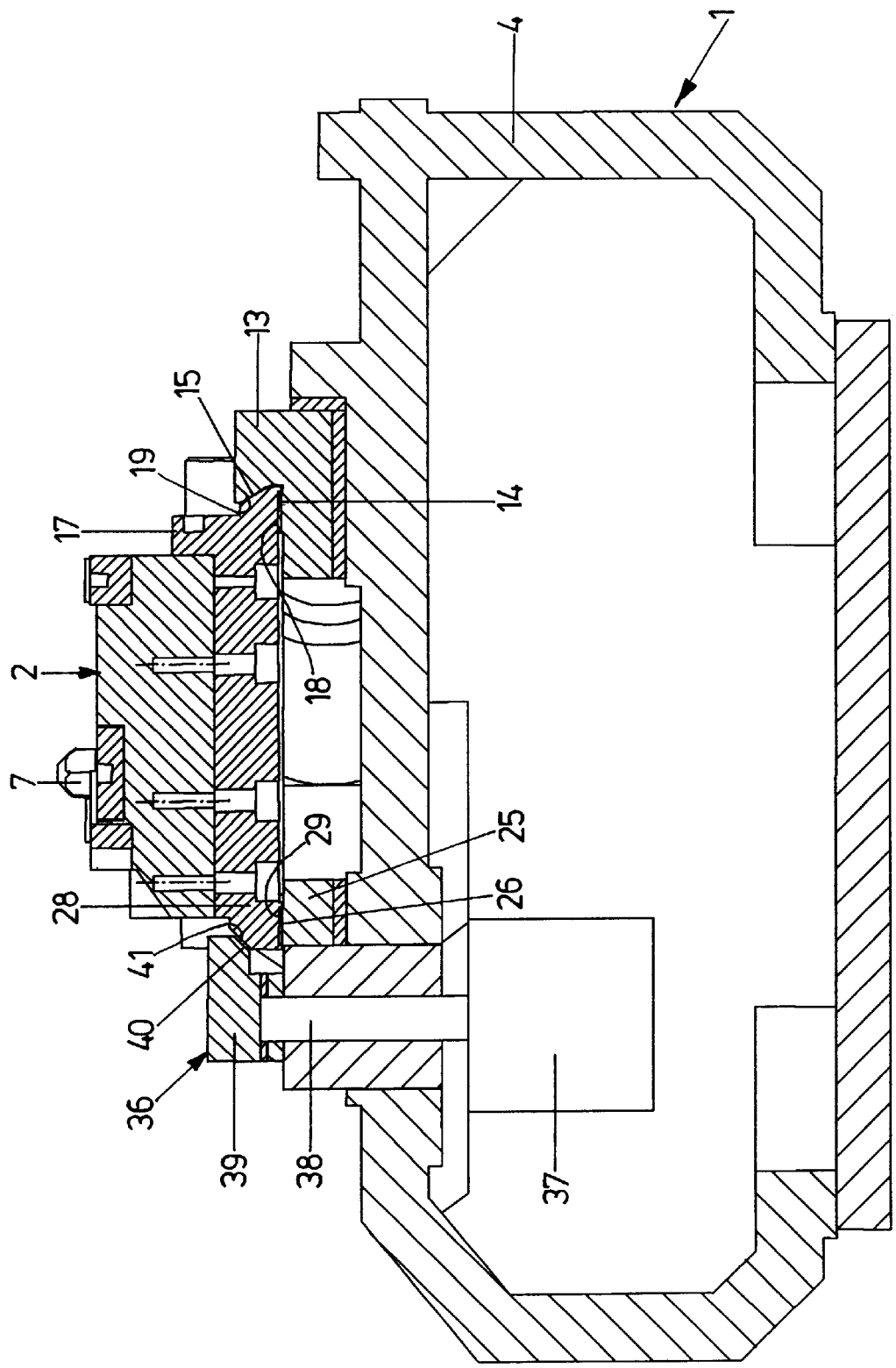
FIG. 8 is a cross-sectional view through the workpiece holder on the line VIII—VIII of FIG. 1.
Figure 9:
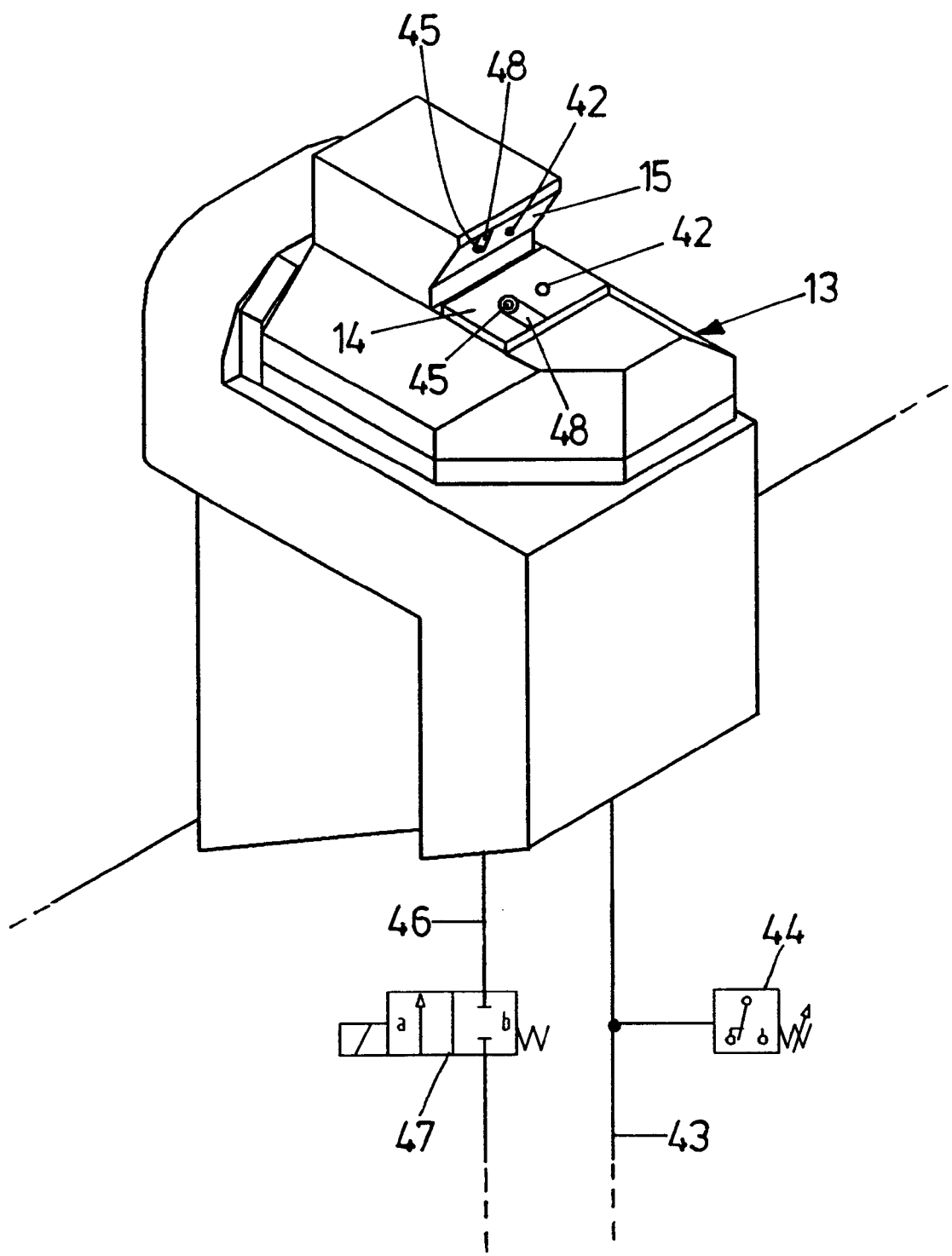
FIG. 9 is a partial view of a holding element on an enlarged scale.

The workpiece holder seen in the drawing is fundamentally comprised of two parts. It consists a box-type workpiece holding fixture 1 and a workpiece rest 2. The workpiece holding fixture 1 has the shape of an angular column with a foot 3 and a rear supporting wall 4. The workpiece holding fixture 1 is arranged in a given position on the machining side of a machine tool, for instance a universal machine center.

The workpiece rest 2 has a basic shape of a flat cuboid and may be comprised of several pieces for manufacturing reasons. It has a workpiece 6 supporting surface 5 which faces away from, and is approximately parallel to, the supporting wall 4, lying on a x-y plane. It is provided with two index pins 7 which stand out from the supporting surface 5 in the z direction, engaging with index holes 8 of identical diameter in the reference surface 9 of the workpiece 6 that is turned towards the supporting surface 5, thereby defining the position of the workpiece 6 relative to the workpiece rest 2 in the plane given by the supporting surface 5. The workpiece 6 is clamped against the supporting surface 5 of the workpiece rest 2 by means of fasteners 11. The fasteners 11 reach through drilled holes 12 in the workpiece rest 2 into the workpiece 6. In the way described, the workpiece 6 takes an accurately defined position relative to the workpiece rest 2.

Means are provided on the workpiece rest 2 and the fixture 1, enabling the fixture 1 and the rest 2 to be connected rapidly and positionally accurately so that the workpiece 6, when transported together with the workpiece rest 2 from a machine tool to another machine tool linked thereto and from there to yet another machine tool linked thereto, has an accurately defined position relative to each machine tool once the workpiece rest 2 has been fixed to an identical fixture 1 allocated to each machine tool.

Two lateral holding elements 13 of identical design are arranged one above the other on the supporting wall 4, each possessing a lower bearing surface 14, these surfaces 14 being arranged in parallel to each other and approximately parallel to the supporting surface 5 i.e., in an x-y plane. The two bearing surfaces 14, 15 of each holding element 13 open in the form of a wedge toward the workpiece rest 2. The upper bearing surface 15 inclines from the workpiece rest 2 downwardly toward the lower bearing surface 14.

Mounted on the work-rest-2 side wall 16 that is turned toward the lateral holding elements 13 are two counterpart holding elements 17 which have counterpart surfaces 18, 19 arranged in the shape of a wedge one relative to the other; upon correct insertion of the counterpart holding elements 17 into the lateral holding elements 13, these counterpart surfaces 18, 19 rest planely and tightly on the bearing surfaces 14 and 15, respectively.

Mounted on the supporting wall 4 of the fixture 1 is a lower support 20 which has a lower bearing surface 21. Allotted to this support 20 is a counterpart support 22 which is formed on the lower side wall 23 of the workpiece rest 2 and has a counterpart surface 24, by means of which the workpiece rest 2 takes an accurate position on the lower support 20.

On the side of the workpiece rest 2 that faces away from the lateral holding elements 13, two bearing elements 25 are provided on the supporting wall 4 of the fixture 1, lying opposite the holding elements 13. They each have a bearing surface 26 extending parallel to the lower bearing surfaces 14 i.e., in the x-y plane. On the associated side wall 27 of the workpiece rest 2, counterpart bearing elements 28 are formed, having a counterpart surface 29 that rests planely on the respective bearing surface 26. When the workpiece rest 2 rests by its counterpart surfaces 18, 19, 24, 29 on the bearing surfaces 14, 15, 21, 26 of the fixture 1, then it has a precisely defined position—any time reproducible—toward each identical workpiece holding fixture 1 in all the three coordinate directions, namely the x direction, y direction and z direction.

The job of detachably fixing the workpiece rest 2 on the fixture 1 in the precisely defined position mentioned takes place as follows:

An oblique chucking appliance 30 is provided on the supporting wall 4 of the fixture 1, working on the x-y plane diagonally of the x direction and diagonally of the y direction. It comprises a pressure-fluid actuated piston-cylinder drive 31, the cylinder 32 of which is mounted on the supporting wall 4 and on the piston rod 33 of which is mounted a chucking hook 34 that bears against an abutment 35 in the vicinity of the side wall 27 of the workpiece rest 2. When the drive 31 is pressure-fluid actuated, then the workpiece rest 2 is forced by this single oblique chucking appliance 30 into the lateral holding elements 13 on the one hand and against the lower support 20 on the other i.e., a single chucking appliance 30 is sufficient for aligning and fixing the workpiece rest 2 relative to the fixture 1 in the x direction as well as in the y direction. In this case, the workpiece rest 2 is aligned and fixed in the lateral holding elements 13 in the z direction.

Provision is made for two holding-down appliances 36 which are allocated to the bearing elements 25 and the counterpart bearing elements 28 and by means of which the workpiece rest 2 is held down on the fixture 1. They comprise pressure-fluid actuated pivot drives 37 which are arranged in the supporting wall 4 and the pivoted shaft 38 of which stands out from the supporting wall 4 in the z direction and is equipped with a chucking lever 39. The chucking lever 39 has a chucking surface 40 which inclines in the z direction and cooperates with a counterpart chucking surface 41 on the respective counterpart bearing element 28. The chucking surface 40 and the counterpart chucking surface 41 slope from the workpiece rest 2 away toward the supporting wall 4 so that, when the workpiece rest 2 is chucked, pressure is exercised by the counterpart surfaces 29 on the bearing surfaces 26 in the direction toward the lateral holding elements 13 for tightly bearing fit to take place there. The pressure-fluid actuated drives 31, 37, which are preferably hydraulically actuated, can be operated very rapidly so that the production of a locking connection between the workpiece rest 2 and the fixture 1 as well as a detachment thereof may take place within fractions of seconds.

Furthermore, arrangements are provided, ensuring that the workpiece rest 2 is being accurately aligned and fixed on the fixture 1 in the way described. Machining a workpiece 6 causes chips or other dirt particles to crop up which might place themselves between a bearing surface and a counterpart surface, causing the position of the workpiece rest 2 relative to the fixture 1 not to correspond precisely to the nominal position. For this to be avoided, pressure-fluid actuated bearing-contact testing ducts 42 are provided in the bearing surfaces 14, 15, 21, 26, of which the drawing only illustrates those in the lower bearing surfaces 14 and 15 of a lateral holding element 13. Once the workpiece rest 2 has been fixed on the fixture 1 by the oblique chucking appliance 30 and the holding-down appliances 36, compressed air is supplied from a compressed-air piping 43 via this bearing-contact testing duct 42. Any pressure drop occurrence means that the respective counterpart surface 18, 19, 24, 29 does not rest planely and tightly on the bearing surface 14, 15, 21, 26. This is detected by a manometric switch that is connected to the piping 43.

For possible cleaning of the bearing surfaces and the counterpart surfaces, rinsing ducts 45 are provided in the bearing surfaces 14, 15, 21, 26; rinsing liquid is supplied via a rinsing pipe 46, cleaning the bearing surfaces and the counterpart surfaces. Control takes place via a solenoid valve 47 in the pipe 46. Suitably, such a cleaning job is performed prior to the chucking operation by means of the oblique chucking appliance 30 and the holding-down appliances 36. In order to prevent a film of rinsing liquid on the bearing surfaces 14, 15 and the counterpart surfaces from hampering any tight contact between these surfaces, a groove-type drain 48 is provided, leading from the respective rinsing duct 45 outwards through the bearing surfaces 14 and 15.

What is claimed is:

1. A workpiece holder, comprising:
    a workpiece holding fixture;
    a workpiece rest, wherein the workpiece rest is provided with arrangements for fixing a workpiece in a given position relative to the workpiece rest and the workpiece holding fixture is provided with bearing surfaces and the workpiece rest is provided with counterpart surfaces that rest on the bearing surfaces for the workpiece rest to have an accurately given position in a first, second and third coordinate direction;
    chucking appliances chucking the workpiece rest relative to the workpiece holding fixture in the first, second and third coordinate direction; and
    two index pins provided on the workpiece rest for engagement with index holes of the workpiece.

2. A workpiece holder according to claim 1, wherein one of the chucking appliances is an oblique chucking appliance, aligning the workpiece rest relative to the workpiece holding fixture in the first and the second coordinate direction.

3. A workpiece holder according to claim 2, wherein the oblique chucking appliance is a pressure-fluid actuated piston-cylinder drive, which is mounted on one of the workpiece holding fixture and the workpiece rest and which has a chucking hook that acts on an abutment formed on the workpiece rest or the workpiece holding fixture.

4. A workpiece holder according to claim 1, wherein at least one of the chucking appliances is provided fixing the workpiece rest relative to the workpiece holding fixture in the third coordinate direction.

5. A workpiece holder according to claim 1, wherein the at least one chucking appliance is a holding-down appliance with a pivot drive mechanism which is mounted on the workpiece holding fixture and which, by a chucking surface, bears against a counterpart chucking surface on the workpiece rest.

6. A workpiece holder according to claim 1, wherein at least one holding element on the workpiece holding fixture is provided, having two bearing surfaces that incline toward one another; and wherein, on the workpiece rest a counterpart holding element is provided having two counterpart surfaces that incline toward one another and are suited to the holding surfaces, resting thereon, whereby the workpiece rest is aligned relative to the workpiece holding fixture in one of the first and second coordinate direction and in the third coordinate direction.

7. A workpiece holder according to claim 1, wherein a pressure-fluid actuated bearing-contact testing duct opens into at least one bearing surface.

8. A workpiece holder according to claim 1, wherein a pressure-fluid actuated rinsing duct opens into at least one bearing surface.

9. A workpiece holder according to claim 8, wherein a groove-type drain is formed in the bearing surface passing from the rinsing duct through the bearing surface.

10. A workpiece holder, comprising:
    a workpiece holding fixture;
    a workpiece rest, wherein the workpiece rest is provided with arrangements for fixing a workpiece in a given position relative to the workpiece rest and the workpiece holding fixture is provided with bearing surfaces and the workpiece rest is provided with counterpart surfaces that rest on the bearing surfaces for the workpiece rest to have an accurately given position in a first, second and third coordinate direction;
    chucking appliances chucking the workpiece rest relative to the workpiece holding fixture in the first, second and third coordinate direction, one of the chucking appliances being an oblique chucking appliance aligning the workpiece rest relative to the workpiece holding fixture in the first and the second coordinate direction, wherein the oblique chucking appliance is a pressure-fluid actuated piston-cylinder drive mounted on one of the workpiece holding fixture and the workpiece rest and the oblique chucking appliance has a chucking hook that act on an abutment formed on the workpiece rest or the workpiece holding fixture.

11. A workpiece holder according to claim 10, wherein two index pins are provided on the workpiece rest for engagement with index holes of the workpiece.

12. A workpiece holder according to claim 10, wherein at least another of the chucking appliances is provided fixing the workpiece rest relative to the workpiece holding fixture in the third coordinate direction.

13. A workpiece holder according to claim 10, wherein at least one holding element on the workpiece holding fixture is provided, having two bearing surfaces that incline toward one another; and wherein, on the workpiece rest a counterpart holding element is provided having two counterpart surfaces that incline toward one another and are suited to the holding surfaces, resting thereon, whereby the workpiece rest is aligned relative to the workpiece holding fixture in one of the first and second coordinate direction and in the third coordinate direction.

14. A workpiece holder according to claim 10, wherein a pressure-fluid actuated bearing-contact testing duct opens into at least one bearing surface.

15. A work piece holder, comprising:
    a workpiece holding fixture;
    a workpiece rest, wherein the workpiece rest is provided with arrangements for fixing a workpiece in a given position relative to the workpiece rest and the workpiece holding fixture is provided with bearing surfaces and the workpiece rest is provided with counterpart surfaces that rest on the bearing surfaces for the workpiece rest to have an accurately given position in a first, second and third coordinate direction;
    chucking appliances chucking the workpiece rest relative to the workpiece holding fixture in the first, second and third coordinate direction, at least one of the chucking appliances being provided fixing the workpiece rest relative to the workpiece holding fixture in the third coordinate direction wherein the at least one of the chucking appliances is a holding-down appliance with a pivot drive mechanism mounted on the workpiece holding fixture and the at least one of the chucking appliances has a chucking surface bearing against a counterpart chucking surface on the workpiece rest.

16. A workpiece holder according to claim 15, wherein two index pins are provided on the workpiece rest for engagement with index holes of the workpiece.

17. A workpiece holder according to claim 15, wherein another of the chucking appliances is an oblique chucking appliance, aligning the workpiece rest relative to the workpiece holding fixture in the first and the second coordinate direction.

18. A workpiece holder according to claim 15, wherein at least one holding element on the workpiece holding fixture is provided, having two bearing surfaces that incline toward one another; and wherein, on the workpiece rest a counterpart holding element is provided having two counterpart surfaces that incline toward one another and are suited to the holding surfaces, resting thereon, whereby the workpiece rest is aligned relative to the workpiece holding fixture in one of the first and second coordinate direction and in the third coordinate direction.

19. A workpiece holder, comprising:

a workpiece holding fixture;

a workpiece rest, wherein the workpiece rest is provided with arrangements for fixing a workpiece in a given position relative to the workpiece rest and the workpiece holding fixture is provided with bearing surfaces and the workpiece rest is provided with counterpart surfaces that rest on the bearing surfaces for the workpiece rest to have an accurately given position in a first, second and third coordinate direction;

chucking appliances chucking the workpiece rest relative to the workpiece holding fixture in the first, second and third coordinate direction; and a pressure-fluid actuated bearing-contact testing duct opening into at least one of the bearing surfaces.

20. A workpiece holder, comprising:

a workpiece holding fixture;

a workpiece rest, wherein the workpiece rest is provided with arrangements for fixing a workpiece in a given position relative to the workpiece rest and the workpiece holding fixture is provided with bearing surfaces and the workpiece rest is provided with counterpart surfaces that rest on the bearing surfaces for the workpiece rest to have an accurately given position in a first, second and third coordinate direction;

chucking appliances chucking the workpiece rest relative to the workpiece holding fixture in the first, second and third coordinate direction; and a pressure-fluid actuated rinsing duct opening into at least one of the bearing surfaces.

* * * * *